United States Patent
Foianini et al.

(10) Patent No.: US 7,225,999 B2
(45) Date of Patent: Jun. 5, 2007

(54) SPRAY ARRAY APPARATUS

(75) Inventors: Curt M. Foianini, California, MD (US); Thomas H. Hane, Tall Timbers, MD (US); Joseph E. Wolfe, Richboro, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 488 days.

(21) Appl. No.: 10/956,525

(22) Filed: Sep. 23, 2004

(65) Prior Publication Data

US 2006/0060711 A1    Mar. 23, 2006

(51) Int. Cl.
*B64D 1/18*    (2006.01)
(52) U.S. Cl. .............. 239/171; 239/14.2; 239/398; 239/418; 239/556; 244/134 R; 244/134 B; 244/134 C
(58) Field of Classification Search .......... 169/53; 239/14.2, 171, 172, 398, 418, 423, 424, 556, 239/558; 244/134 R–134 D
See application file for complete search history.

(56) References Cited

U.S. PATENT DOCUMENTS

| | | | | |
|---|---|---|---|---|
| 3,706,414 A | * | 12/1972 | Dupre ........................ 239/14.2 |
| 3,897,904 A | * | 8/1975 | Kiegerl ...................... 239/14.2 |
| 4,194,689 A | * | 3/1980 | Ash ............................ 239/2.2 |
| 4,465,230 A | * | 8/1984 | Ash ............................ 239/2.2 |
| 4,479,610 A | * | 10/1984 | Etheridge et al. ........... 239/171 |
| 4,927,080 A | * | 5/1990 | Alsing ......................... 239/77 |
| 5,248,086 A | * | 9/1993 | Waldrum et al. ............. 239/10 |
| 5,400,965 A | * | 3/1995 | Ratnik et al. ................ 239/2.2 |
| 5,823,427 A | * | 10/1998 | Dupre et al. ................ 239/14.2 |
| 7,083,121 B2 | * | 8/2006 | Huffman ..................... 239/398 |
| 2006/0113400 A1 | * | 6/2006 | Dodson ..................... 239/14.2 |

* cited by examiner

*Primary Examiner*—Joseph A. Kaufman
*Assistant Examiner*—Jason Boeckmann
(74) *Attorney, Agent, or Firm*—Mark O. Glut; Ron Billi

(57) ABSTRACT

Spray array apparatus which includes a plurality of water and air carrying spoke members extending radially from a central fluid distribution assembly. The spoke members are connected to a plurality of water and air carrying strut members. The spoke members are divided into segments and the segments and strut members are detachably joined together by means of manifold joints which have water and air passageways allowing fluid communication between spoke segments and strut members. The apparatus is towed at the end of a boom of a tanker aircraft and is connected to the boom by means of a gimbal allowing two degrees of freedom to reduce bending moments and connection stresses. Selected fluid parameters are transmitted to the tanker aircraft to adjust fluid flow, if necessary.

15 Claims, 15 Drawing Sheets

SPRAY ARRAY APPARATUS

STATEMENT OF GOVERNMENT INTEREST

The invention described herein may be manufactured and used by or for the Government of the United States of America for government purposes without the payment of any royalties therefor.

BACKGROUND OF THE INVENTION

Various methods exist for the study of ice build up on aircraft surfaces and components such as weapons systems, radomes, antennas, etc. This information is required to ensure that the aircraft and weapons systems are capable of operating within worldwide environmental conditions. These methods for the study of ice build up include analytical computer simulation, icing wind tunnels, environmental chambers and flight testing in natural icing conditions.

All of these methods however have drawbacks. For example, computer simulation can predict ice shapes accurately only over a limited range of icing conditions and cannot predict the complex nature of ice shapes formed in three dimensional flow conditions. Likewise, icing wind tunnels and environmental chambers cannot cover the full range of the test envelopes and there are problems with wall effects, cloud size and uniformity, turbulence, attainable airspeeds and the size of models that can be accommodated. It is also difficult to simulate freezing rain and drizzle. Actual in-situ testing is difficult because all types of natural icing conditions may not be available and there is a significant safety risk since the test conditions cannot be controlled.

To obviate these drawbacks, use is made of a spray array trailed behind a tanker aircraft for generating various types of spray conditions into which a trailing aircraft under test is flown. Presently used spray arrays are limited with regard to simulating all required conditions and have difficulty in maintaining a uniform cloud with representative droplet sizes. In addition, one type of array in common use is comprised of radially extending spokes with connecting struts, all of which are joined by welding. Often, after a flight test, examination of the array reveals many cracks, necessitating a rewelding operation.

It is an object of the present invention to provide for an improved spray apparatus which obviates the drawbacks of the prior art and which may be used for testing of not only military aircraft, but is also useful in the commercial aircraft industry for conducting icing tests to obtain flight certification for flight into known icing conditions.

SUMMARY OF THE INVENTION

The spray apparatus includes an array of fluid conducting members each including a water channel and an air channel for respectively receiving water and warm air from a remote source. Each fluid conducting member has a rounded leading edge and a tapered trailing edge defining an airfoil. Selected ones of the fluid conducting members include one or more spray nozzles positioned at the trailing edge thereof and in fluid communication with the water and air channels. A plurality of manifold joints is provided with each having water and air passageways. Each of the manifold joints is detachably connected to a plurality of the fluid conducting members and allows fluid communication between the connected fluid conducting members.

In one embodiment a plurality of spoke members, having water and air channels, extend radially from a central fluid distribution assembly which distributes the water and warm air to selected ones of the spoke members. The spoke members are interconnected with a plurality of strut members, also including water and air channels. The connections are made by the above mentioned manifold joint.

BRIEF DESCRIPTION OF THE DRAWINGS

The invention will be better understood, and further objects, features and advantages thereof will become more apparent from the following description of the preferred embodiment, taken in conjunction with the accompanying drawings, in which.

DETAILED DESCRIPTION OF THE PREFERRED EMBODIMENTS

Figure 1:
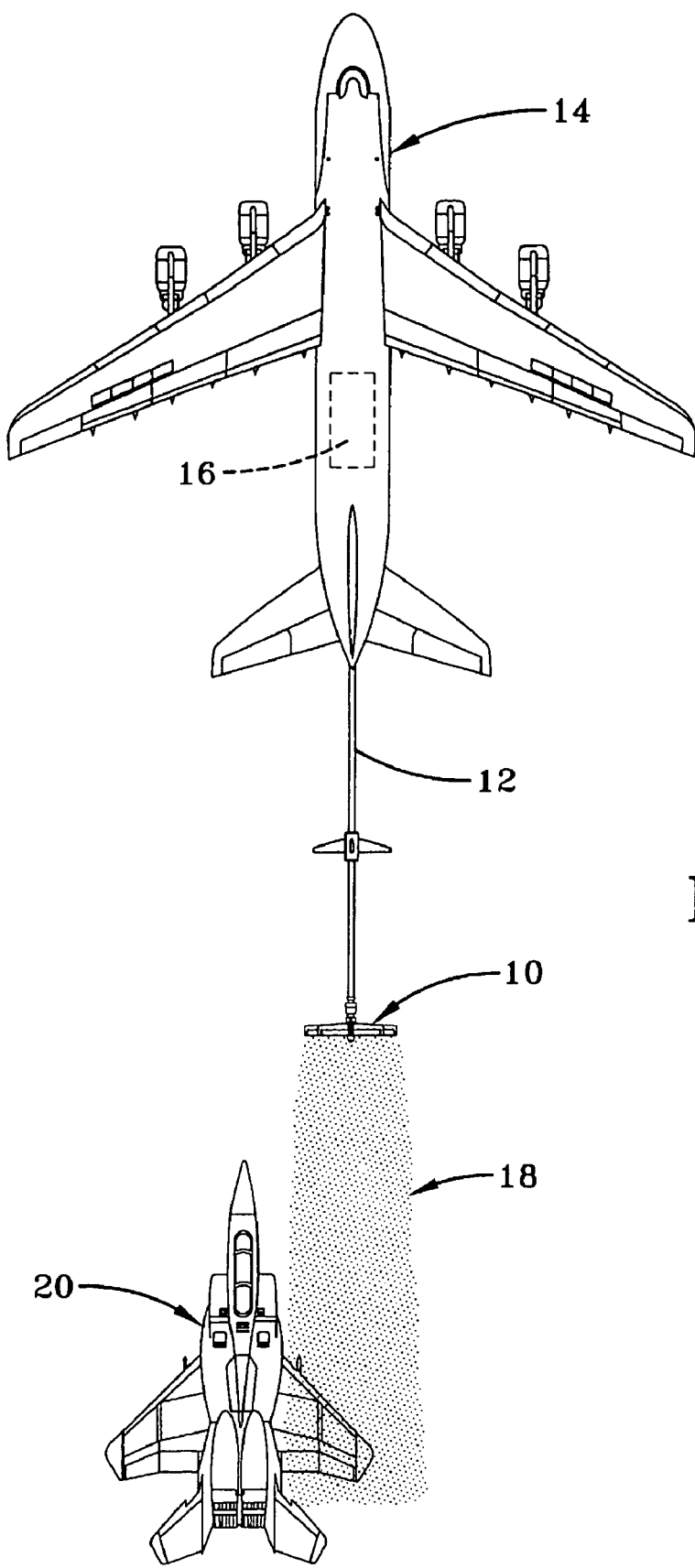
FIG. 1 is a view of an aircraft undergoing a test with the apparatus of the present invention.

In the drawings, which are not necessarily to scale, like or corresponding parts are denoted by like or corresponding reference numerals.

Although the apparatus of the present invention may be used in wind tunnels, or the like, it will be described, by way of example, with respect to in-situ testing under actual flight conditions. FIG. 1 illustrates the spray apparatus 10 at the end of a boom 12 of a tanker aircraft 14. Tanker aircraft 14 supplies water and warm air, typically engine bleed air, as governed by control station 16, to nozzles of the spray apparatus 10 to generate a cloud 18 having precisely controlled droplet sizes and liquid water content to meet certain standards. An aircraft 20 under test flies behind the spray apparatus 10 whereby different portions of the aircraft 20 and elements carried by it may be tested under icing as well as rain conditions.

Figure 2:
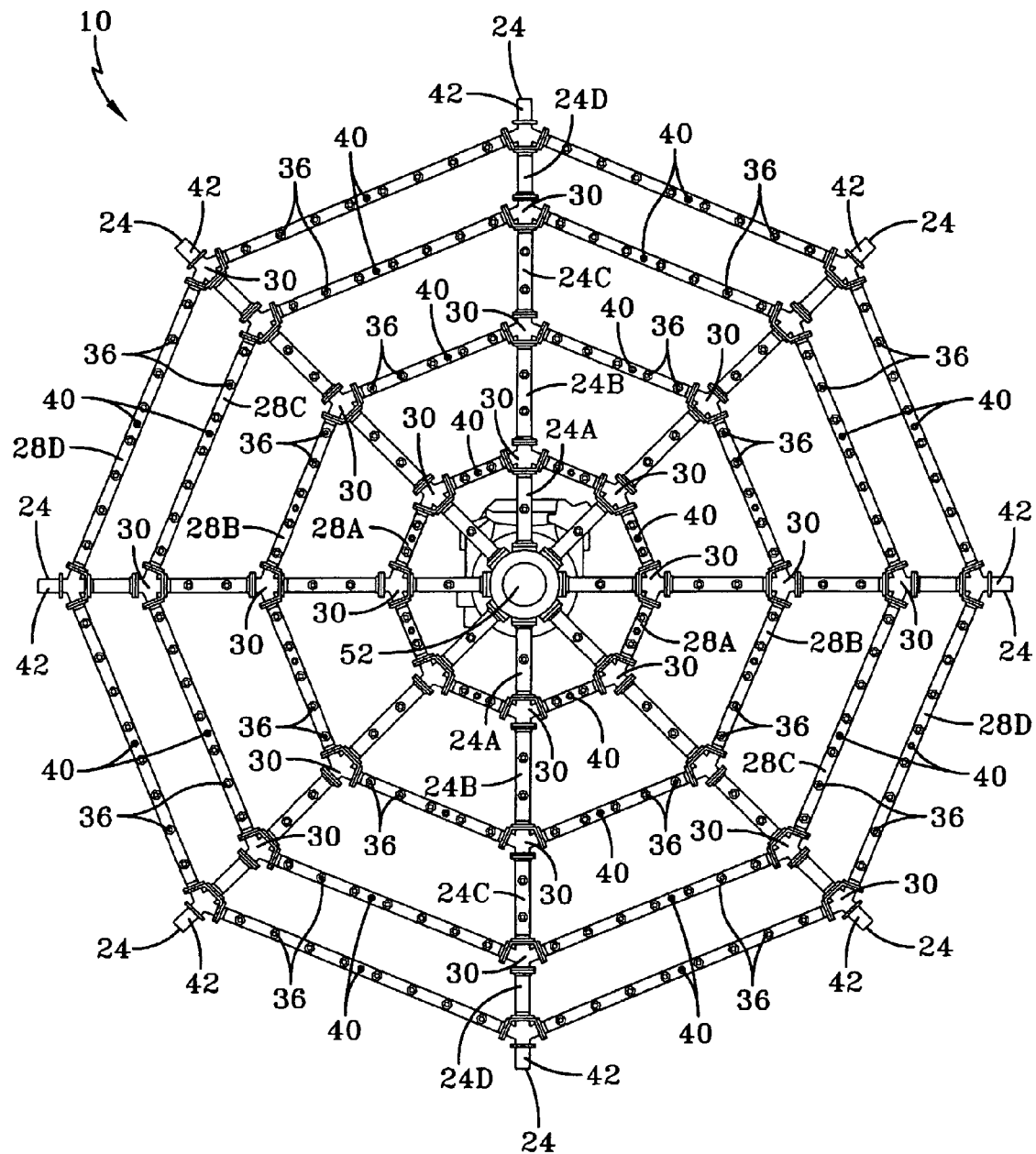
FIGS. 2, 3 and 4 are respective front, side and perspective views of the apparatus.
Figure 3:
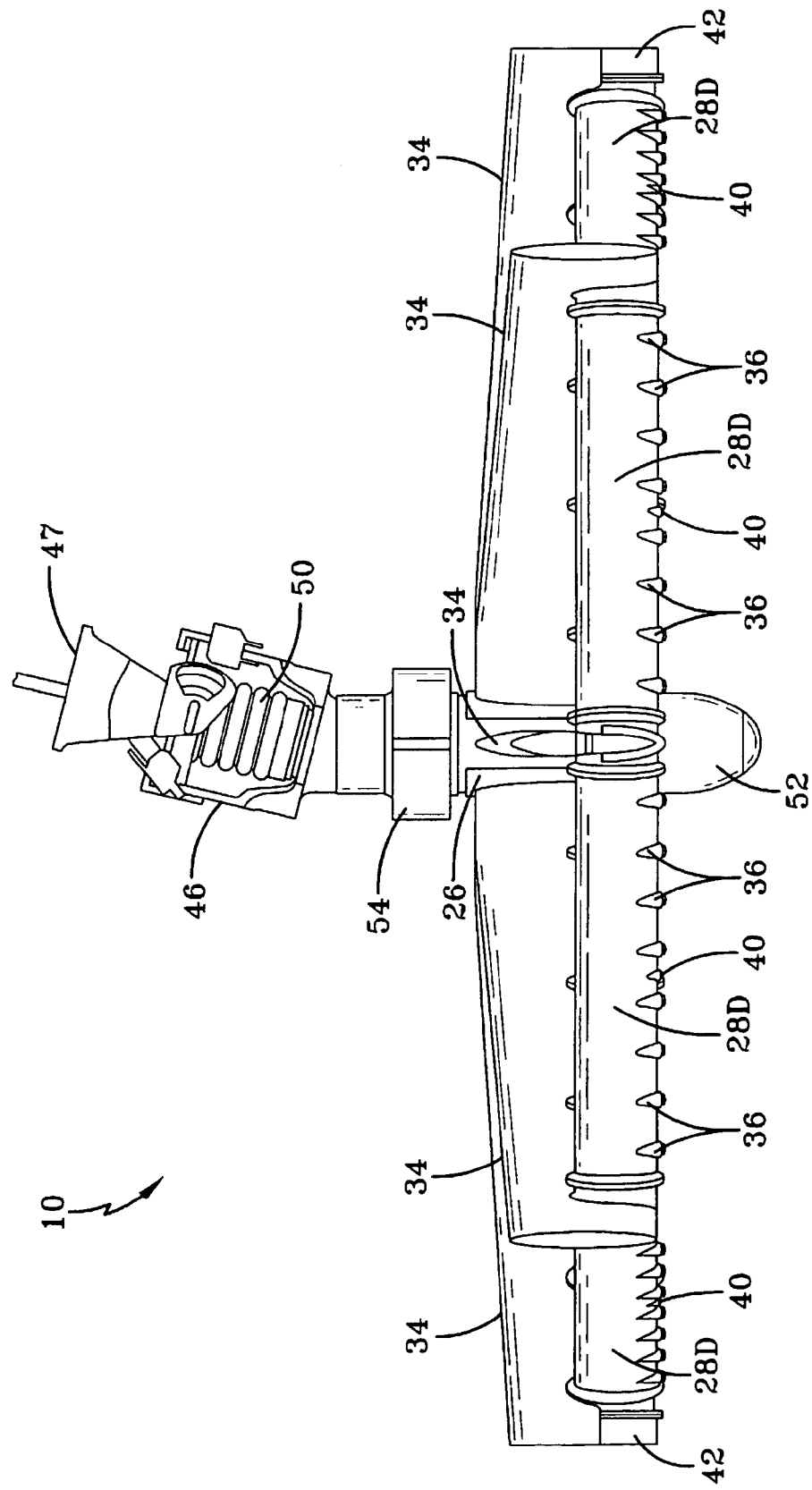
Figure 4:
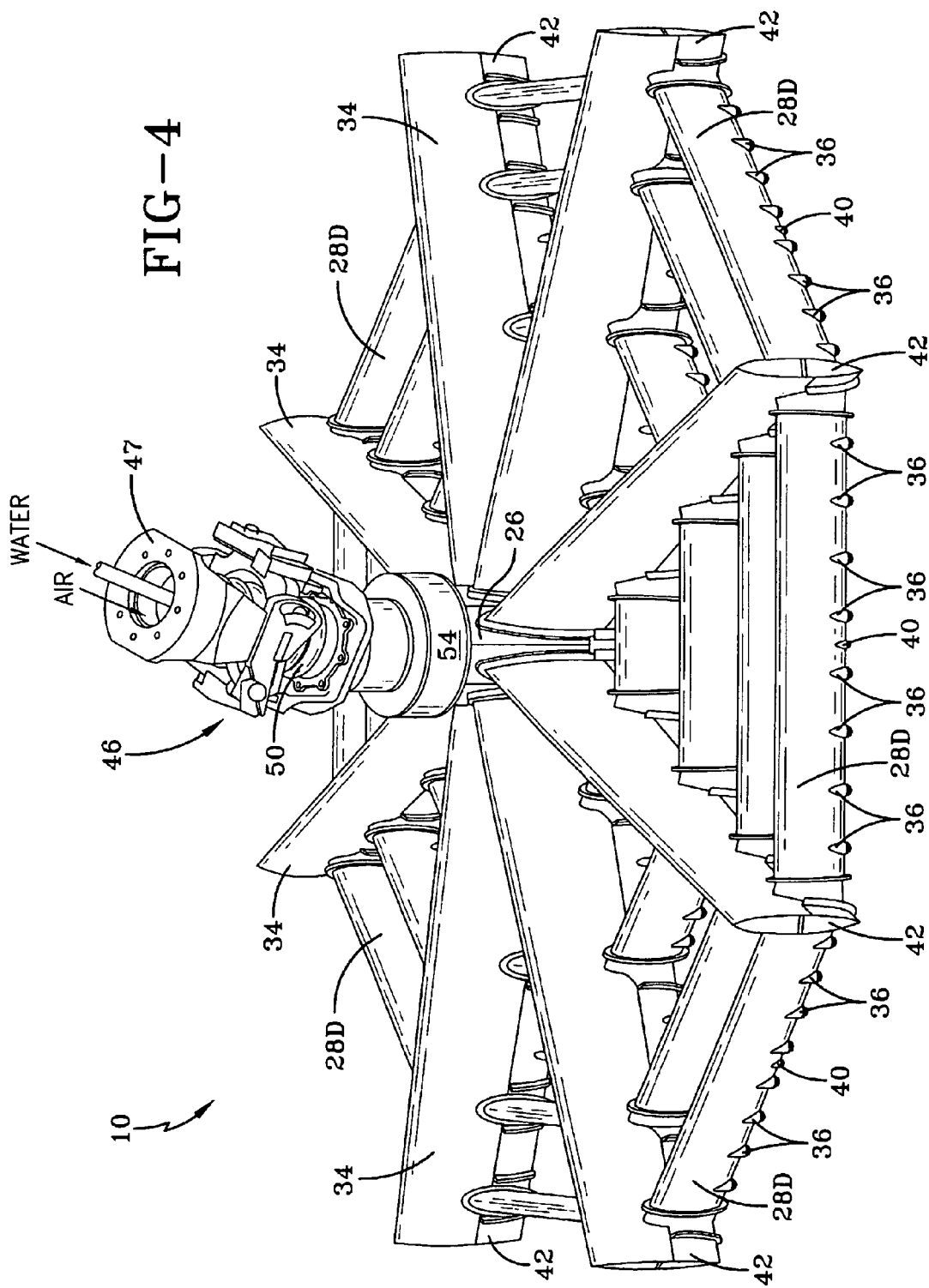

Referring now collectively to FIGS. 2 to 4, the spray apparatus 10 includes an array of fluid conducting members which in one embodiment, is comprised of a plurality of spoke members 24, having separate fluid channels for conduction of water and warm air. The spoke members 24 are connected to, and extend radially from, a central fluid distribution assembly 26. The fluid conducting members also include a plurality of strut members 28a to 28d, also having fluid channels, with each strut member 28a to 28d being connected to adjacent spoke members 24.

Each spoke member 24 is comprised of a plurality of individual radially arranged spoke segments 24a to 24d connected together and to adjacent respective strut members by means of a manifold joint 30 which, as will be seen, includes fluid passageways for distributing supplied water and warm air throughout the array. A shroud 34 attached to the spoke segments of each spoke member 24, as well as to the manifold joints, has a rounded leading edge (facing the tanker aircraft) while the spoke segments 24a to 24d each have a tapered trailing edge (facing the aircraft under test) so that the spoke members 24 have an airfoil shape. Similarly, each strut member 28a to 28d has a rounded leading edge and a tapered trailing edge to also define an airfoil shape. The airfoil shape of the fluid conducting members serves to reduce aerodynamic drag, reduce the turbulent boundary layer and prevent recirculation about the array.

Connected at the trailing edge of selected spoke segments 24a to 24d, and strut members 28a to 28d, are nozzle assemblies 36 which are in fluid communication with the water and warm air channels in the spoke segments 24a to 24c and strut members 28a to 28d. For the particular design illustrated, no nozzle assembly is included in spoke segment 24d because laboratory testing illustrated the possibility of droplet coalescence which would have an adverse effect on the performance of the array. A bleed air bolt 40 is positioned in the middle of the array of nozzle assemblies 36 of each strut member 28a to 28d. Bolt 40 includes a central aperture of a selected size so as to allow a controlled bleed of warm air within the strut members to the outside air. If the warm air within the fluid conducting members should get too cold, the air may be expelled through a series of solenoid valves 42 at the end of each spoke member 24. In this manner, a large volume of new warm air may be quickly introduced into the array to prevent any potential icing on the array.

Spray apparatus 10 is connected to the boom 12 by means of a gimbal 46 having a boom attachment flange 47 at one end, the other end being attached to the fluid distribution assembly 26. Gimbal 46 has two degrees of freedom, that is, rotation about two mutually perpendicular axes which allows the array to weathervane in the air stream, thereby reducing bending moments and stresses on the connection to the boom. Centrally located within the gimbal 46 is a flexible bellows 50 which confines the supplied warm air from the tanker aircraft 14 and delivers it to the fluid distribution assembly 26.

The apparatus includes a plurality of sensors disposed throughout the array to obtain indications of water pressure and water temperature, as well as warm air pressure and warm air temperature. Other sensors such as strain gages and accelerometers may also be included. An electronics section is provided and may be located within a tailcone 52. As will be seen, such electronics section receives the outputs from the sensors, conditions the signals and transmits them to the control station 16 on the tanker aircraft 14.

In order to supply power to the electronics section within tailcone 52, a battery pack 54 is provided and is in a package which surrounds, and is detachable from, the fluid distribution assembly 26. The batteries within battery pack 54 may also provide power to operate the solenoid valves 42.

Figure 5:
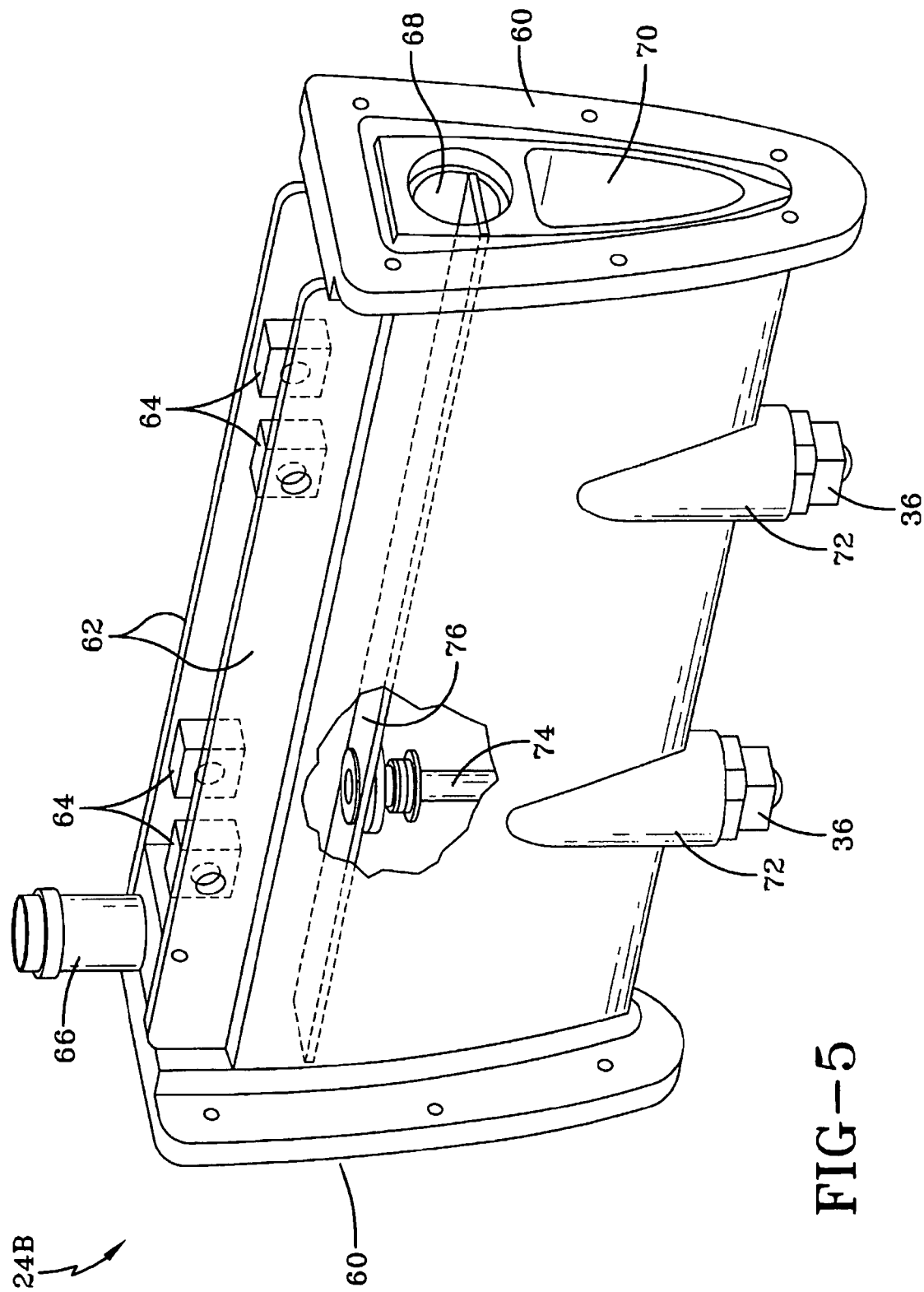
FIG. 5 is a view of a spoke segment.

FIG. 5 illustrates a spoke segment 24b, with a portion broken away to illustrate the nozzle assembly 36 connection. Each spoke segment includes flange members 60 at either end thereof for connection to respective manifold joints 30. Flanges 62 and connectors 64 accommodate and secure a shroud member 34 (not illustrated). In the particular embodiment illustrated, the array includes N spoke members 24 of interconnected spoke segments 24a to 24d, where N=8. However, it is not necessary to connect every spoke member to the fluid distribution assembly 26 and a water connection to only N/2, or 4 of the spoke members 24, is sufficient to completely fill the array with water by virtue of the connections to the manifold joints 30. The spoke segment 24b illustrated in FIG. 5 is of the type which will receive water via water tube 66.

Spoke segment 24b includes a water channel 68 to which the water tube 66 is connected, and additionally includes an air channel 70 for receiving warm air. Each nozzle housing 72 accommodates a nozzle assembly 36 which has a stem 74 extending to the water channel 68 and is secured to it by a nut rail 76. Each nozzle assembly 36 therefore, receives water from water channel 68 and warm air from air channel 70 to produce a fine spray, which together with all the other nozzle assemblies results in the desired cloud 18, as in FIG. 1.

Figure 6:
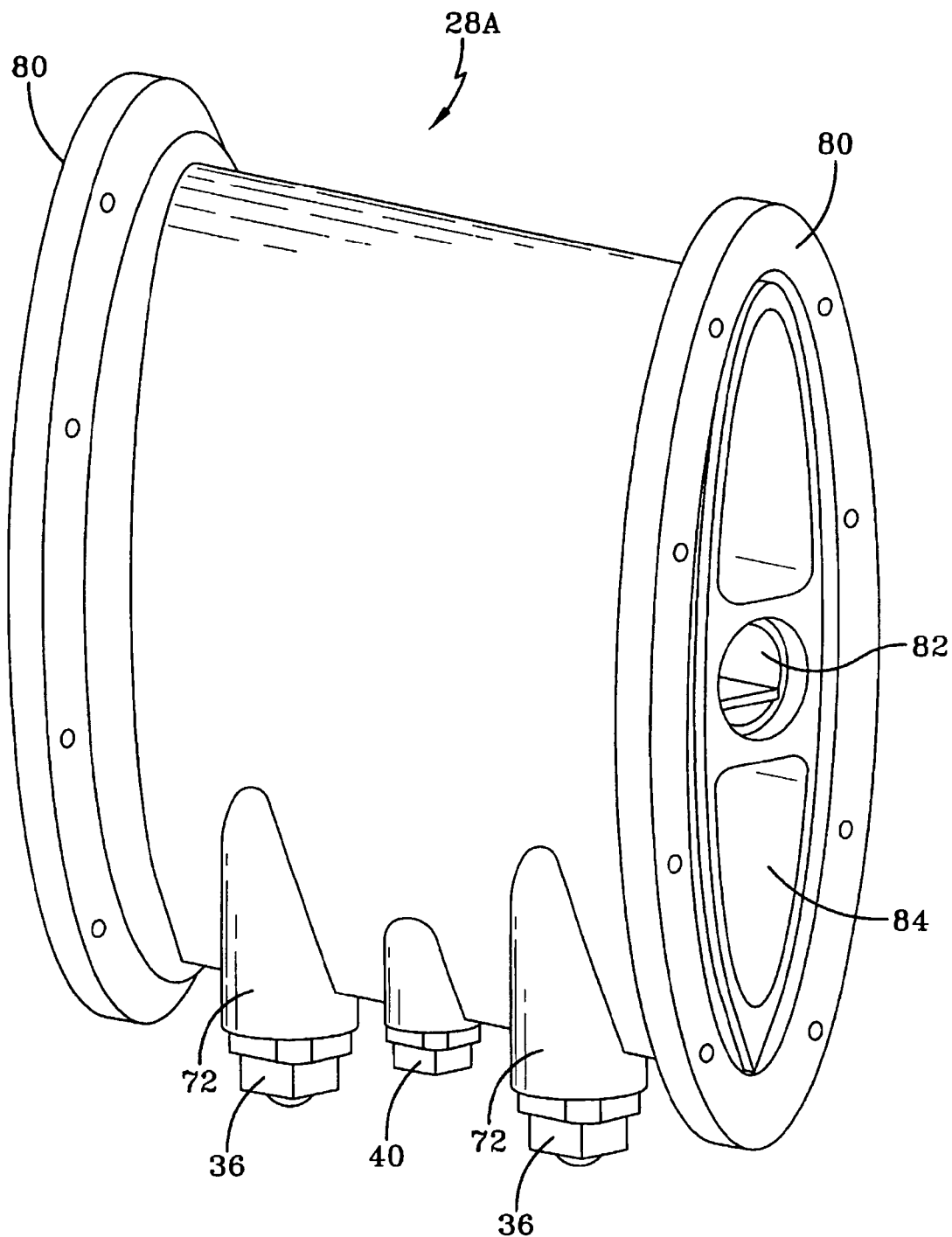
FIG. 6 is a view of a strut member.

FIG. 6 illustrates a typical strut member, strut member 28a being illustrated as exemplary. Strut member 28a includes flanges 80 at either end thereof for connection to respective manifold joints 30. Strut member 28a has a central water channel 82 and an air channel 84, for receiving water and warm air respectively, from adjacent spoke members to which it is attached via manifold joints. Nozzle assemblies 36 are connected to the water channel 82, as in FIG. 5, and bleed air bolt 40 is directly open to the air channel 84 via its internal aperture.

Figure 7:
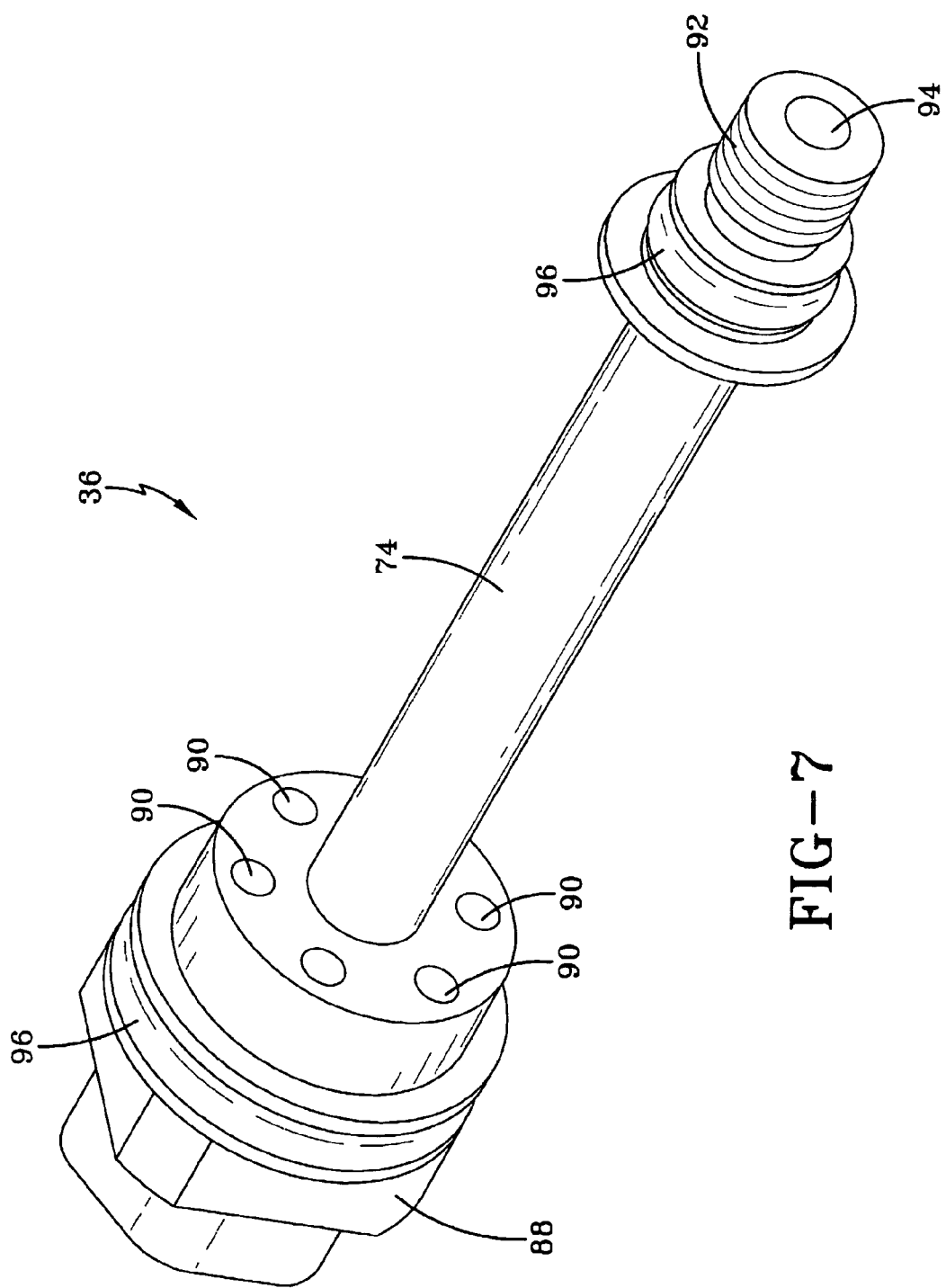
FIG. 7 illustrates a nozzle assembly.

FIG. 7 illustrates a typical nozzle assembly 36 which includes a nozzle head 88 having a plurality of apertures 90 through which the warm air flows. Stem 74 has a threaded end 92 for attachment to a nut rail 76 such as illustrated in FIG. 5. With the connection to a water channel, water will flow through aperture 94 in the end 92 to, and out, the nozzle head 88 where it is met with the warm air flow for atomizing into the desired cloud size. A series of O-rings 96 ensure for water and air tight sealing.

Figure 8:
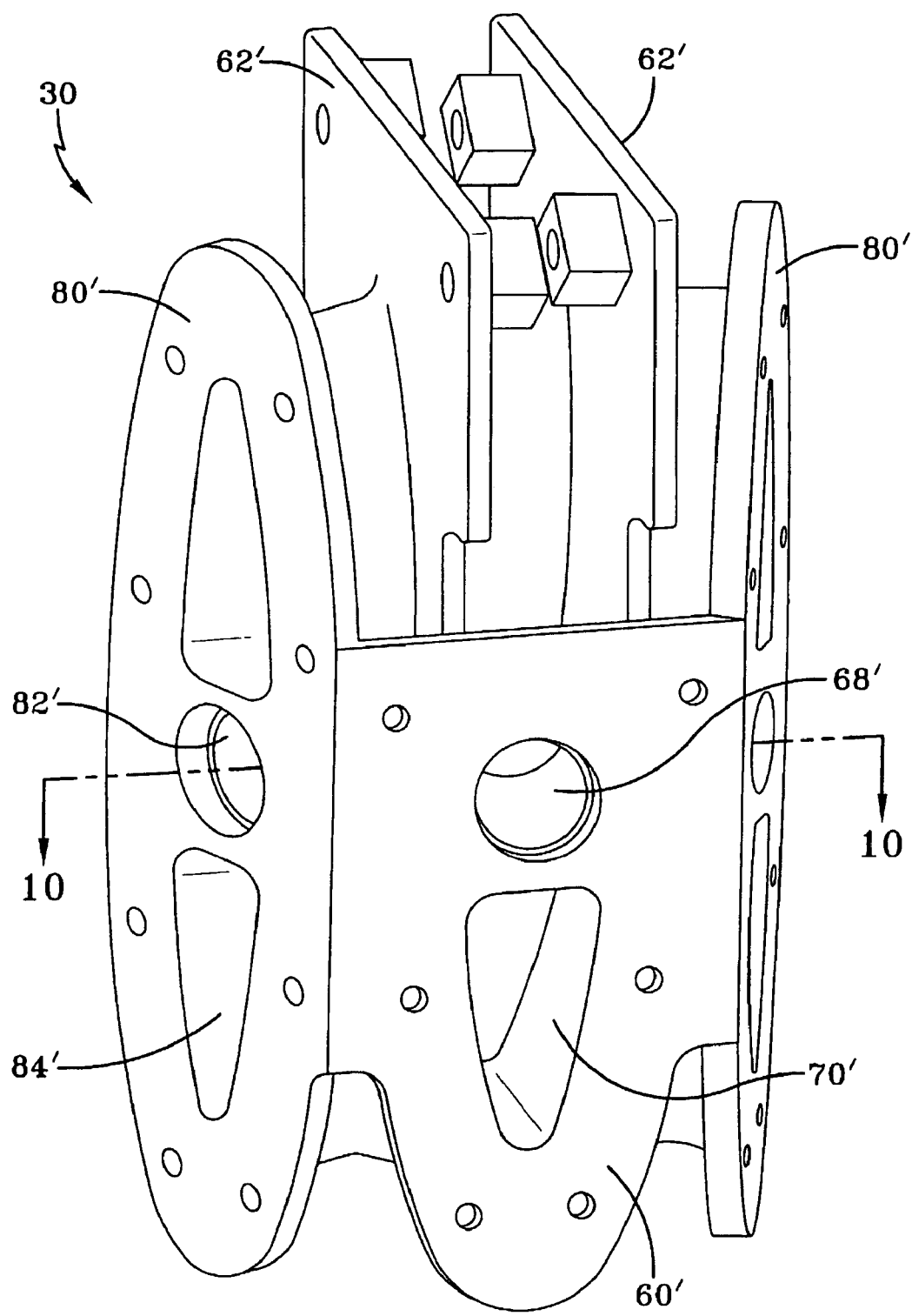
FIG. 8 is a view of one side of a manifold joint.
Figure 9:
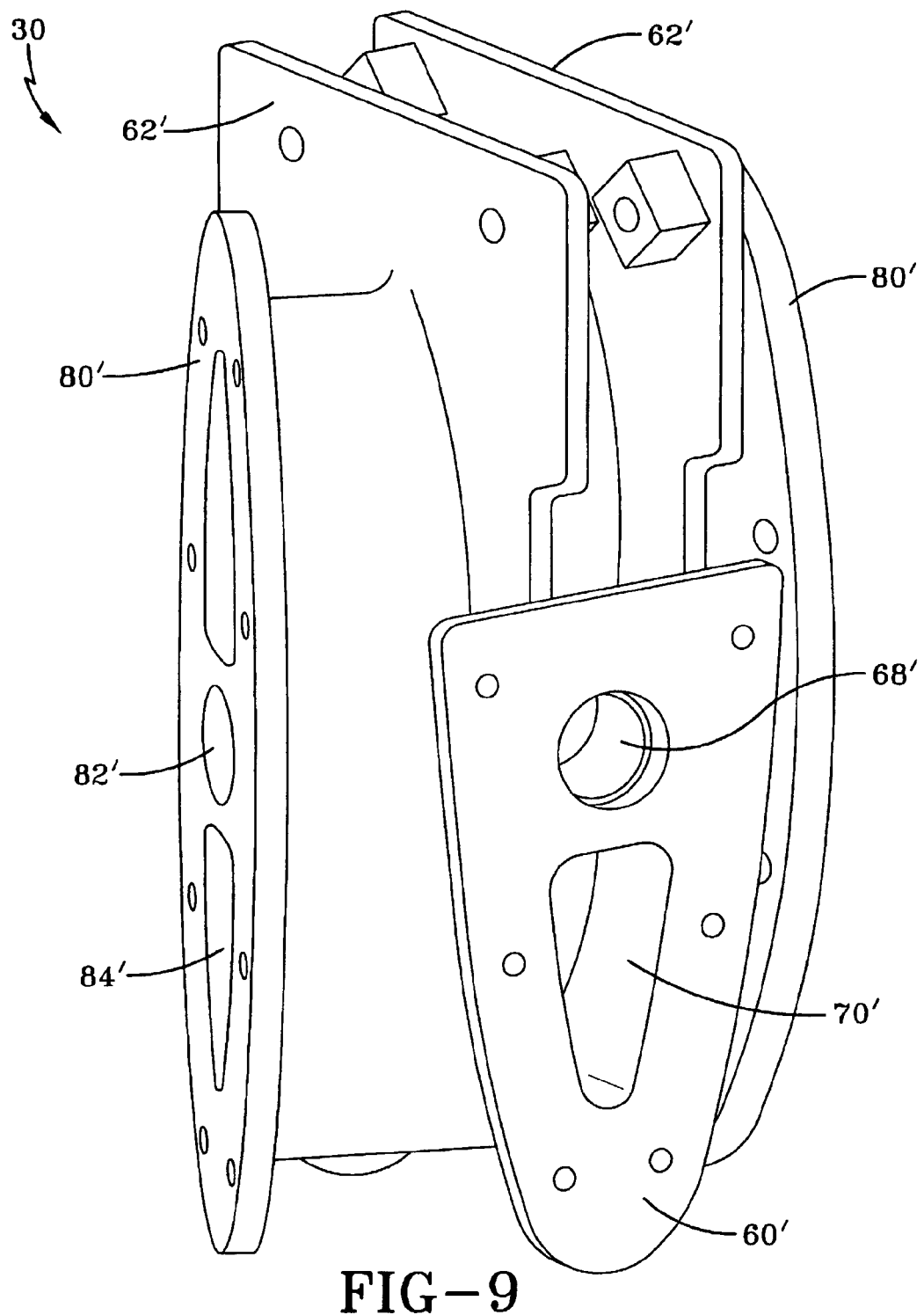
FIG. 9 is a view of another side of the manifold joint.
Figure 10:
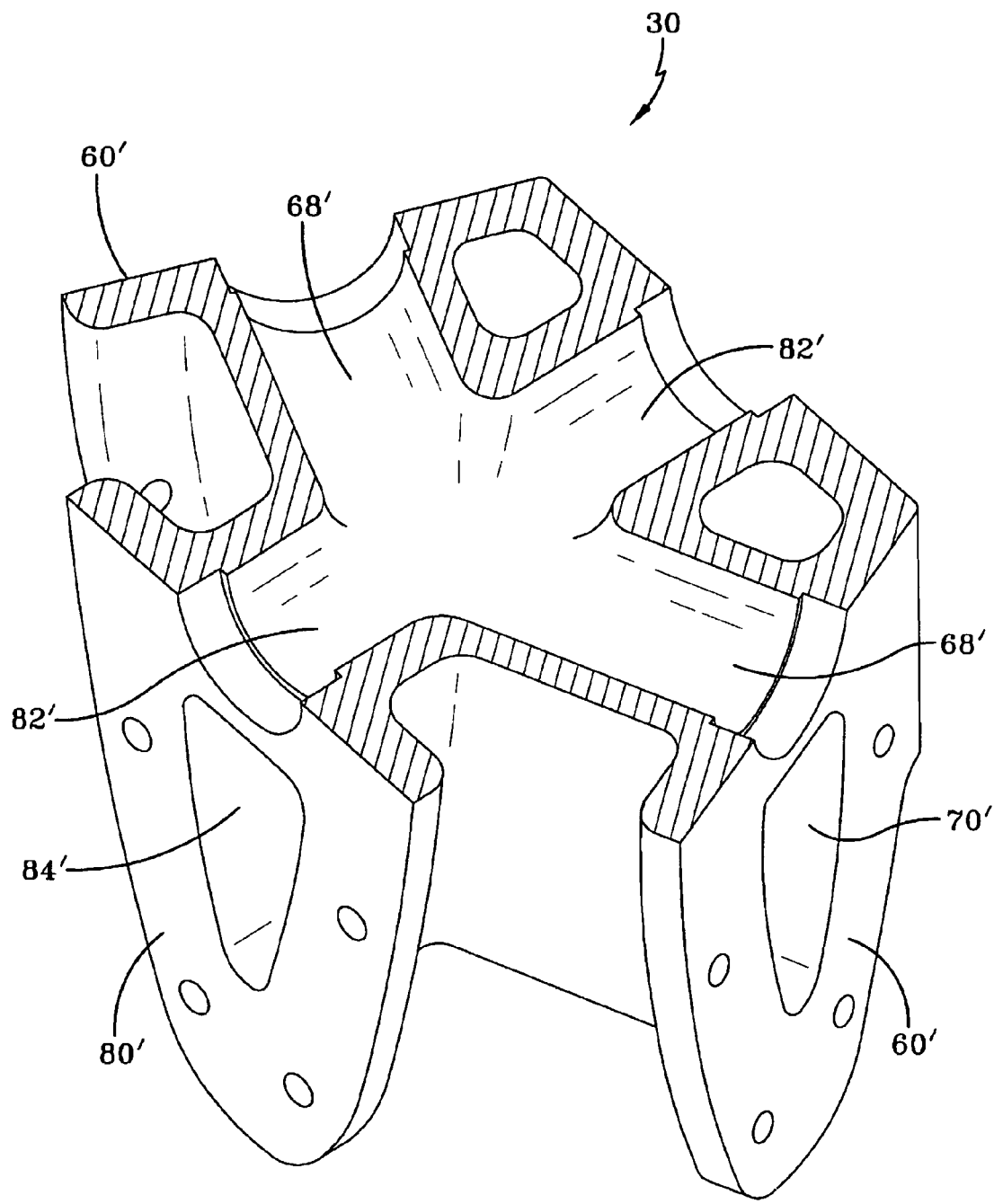
FIG. 10 is a view along the line 10-10 of FIG. 8.

FIGS. 8, 9 and 10 show different views of a manifold joint 30. The manifold joint 30 includes flanges 60' for connection to corresponding flanges 60 in FIG. 5 whereby water and air channels 68 and 70 of a spoke member will line up with corresponding water and air passages 68' and 70' respectively of manifold joint 30. Similarly, flanges 80' connect to corresponding flanges 80 in FIG. 6 whereby water and air channels 82 and 84 of a strut member will line up with corresponding water and air passages 82' and 84' respectively of manifold joint 30. Flanges 62' on top of manifold joint 30 serve the same purpose as flanges 62 of FIG. 5 in providing attachment points for a shroud member. In the cross-sectional view of FIG. 10 it may be seen that water passageways 68' and 82' are all interconnected. Although not illustrated, the same would be true of air passageways 70' and 84'.

Figure 11:
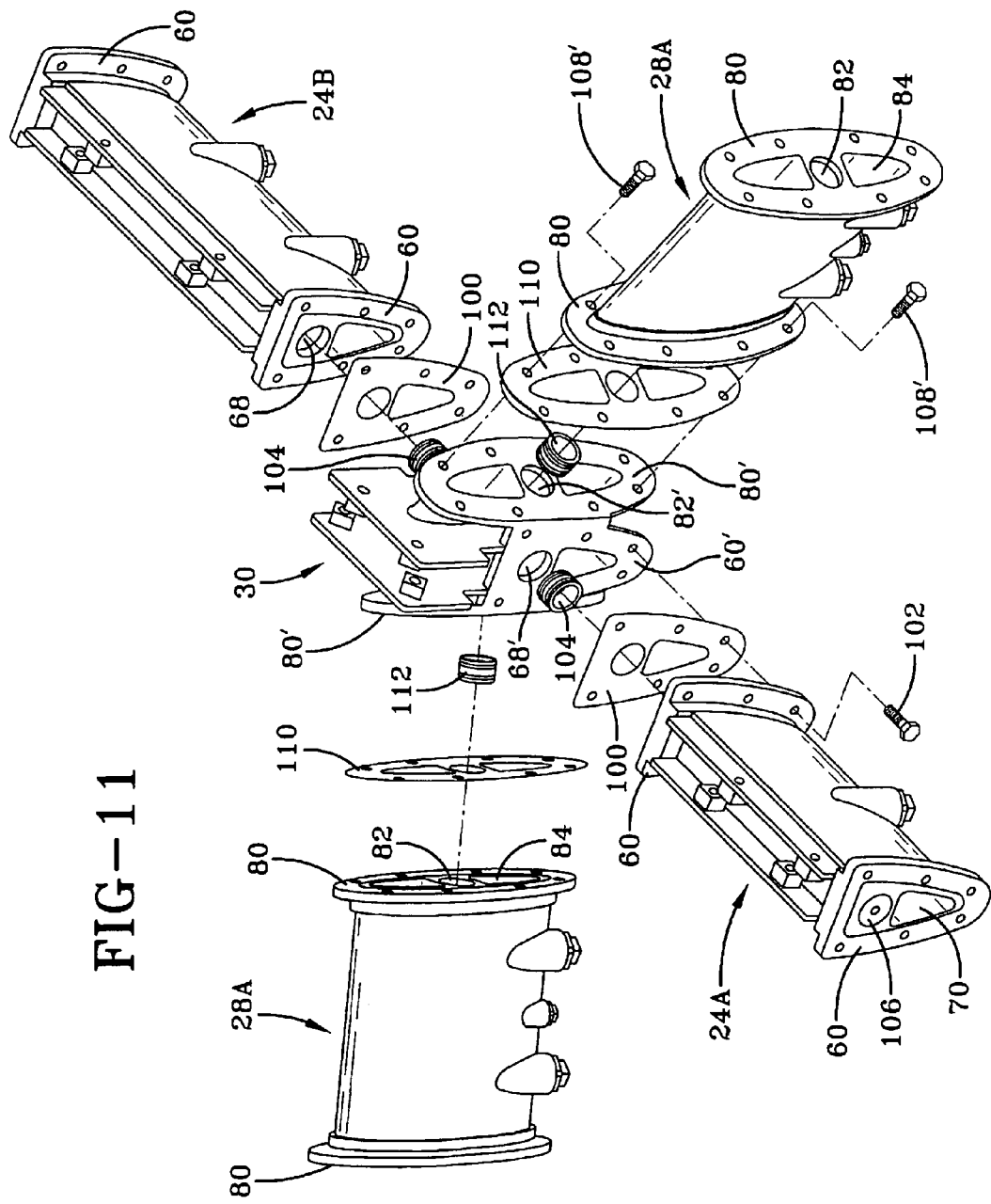
FIG. 11 is an exploded view of connections to a manifold joint.

FIG. 11 is an exploded view illustrating a typical interconnection of strut members and spoke segments with a manifold joint 30. Flanges 60 of two adjacent spoke segments 24a and 24b are joined to flanges 60' of manifold joint 30 with interposed gaskets 100, by a series of fasteners 102. Water tubes 104 are positioned in the juncture of water channels 68 of spoke segments 24a and 24b, and water passageways 68' of manifold joint 30 to ensure for efficient water transfer. It is to be noted that spoke segment 24a is directly connected to the fluid distribution assembly 26, to be described, and includes a plug 106 to prevent water leakage.

Two strut members 28a are illustrated and connect to manifold joint 30 via respective flanges 80 and 80', by fasteners 108. Gaskets 110 are interposed between the connection, as are water tubes 112, bridging water channels 82 of strut members 28a with water passageways 82' of manifold joint 30. In the prior art spray apparatus, fluid conducting members are welded together and constant expansion and contraction with temperature changes often cracked the connections, requiring a rewelding operation before the next flight test. In the present invention, the manifold joint 30 and method of attaching the fluid conducting members, that is, flange to flange with fasteners and with interposed gaskets, completely eliminates the cracking and rewelding problems.

Figure 12:
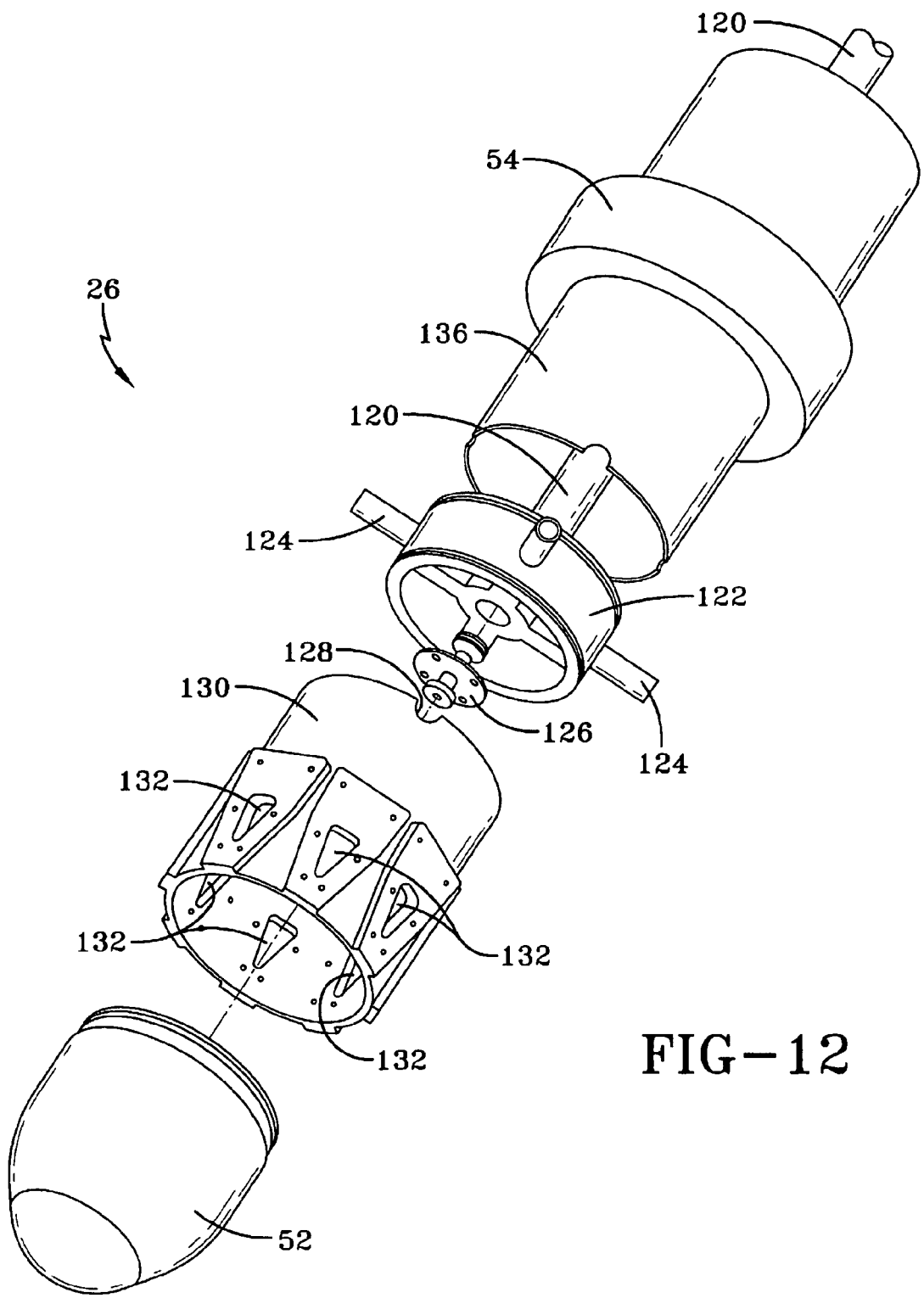
FIG. 12 is an exploded view of a fluid distribution assembly.

FIG. 12 illustrates an exploded view of fluid distribution assembly 26. The assembly includes a center tube 120 which receives water from the tanker aircraft and provides it to water displacement block 122 which has four outlet tubes 124 for delivery of the incoming water to every other spoke member 24. A choke 126 connected in the water displacement block 122 and in the water path, may be selected from a set of chokes having different size orifices to govern the flow rate of water supplied to the spoke members which receive water. Prior art arrays had no means within the array to govern flow rate of water. These chokes add to the fidelity of the array thus making the design and method more controllable.

Outlet tubes 124 nest in respective grooves 128 of a hub member 130 having eight openings 132 arranged around its periphery, with tailcone 52 connected at its end. A sleeve 136 surrounds center tube 120 and confines the warm air coming from the bellows 50 (FIG. 3) whereby the warm air is directed out through openings 132 of hub 130 and into all spoke members. Also shown in FIG. 12 is the battery pack 54 which surrounds sleeve 136.

Figure 13:
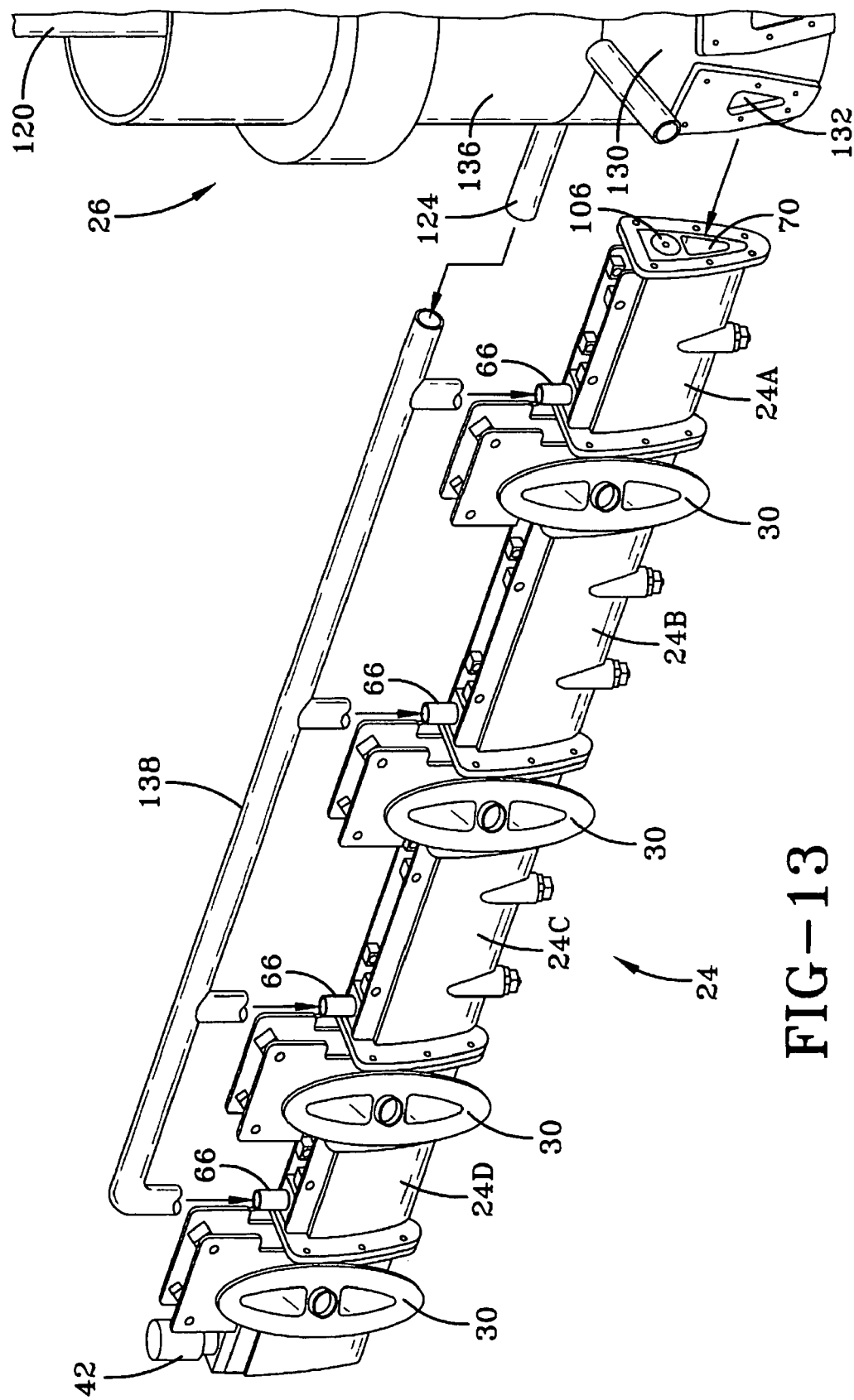
FIG. 13 illustrates water and air distribution in a spoke member.

The distribution of water and warm air to a representative spoke member 24 is illustrated in the exploded view of FIG. 13. A water distribution tube 138 connects with outlet tube 124 of the fluid distribution assembly 26 and delivers water to all of the water tubes 66 of respective spoke segments 24a to 24d. Air channel 70 of the first spoke segment 24a is in line with an opening 132 of hub 130 for receiving supplied warm air. Also illustrated in FIG. 13 is a solenoid valve 42 connected at the outermost end of spoke member 24.

Figure 14:
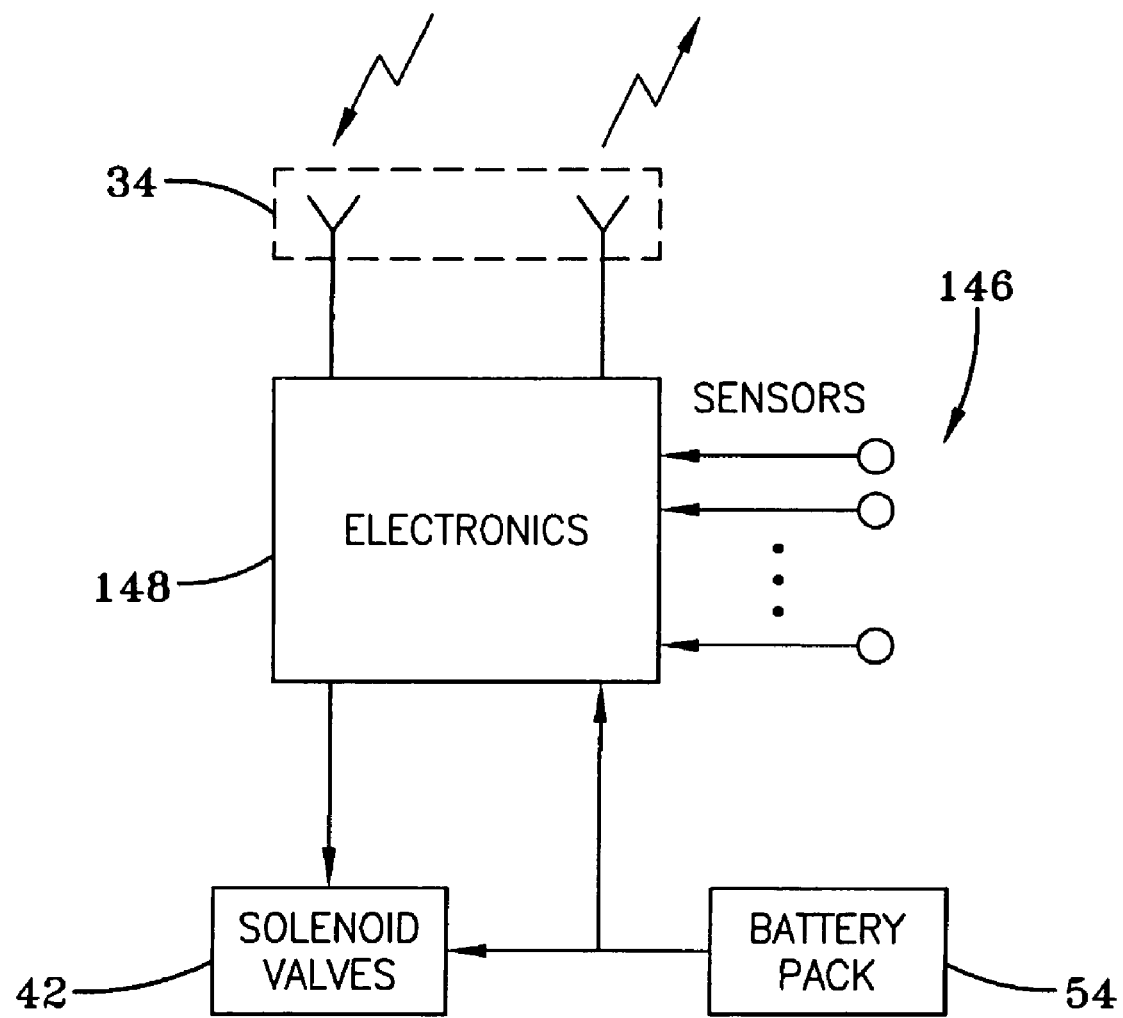
FIG. 14 is a block diagram of the electrical portion of the apparatus.

As previously stated, the apparatus includes a plurality of sensors including, but not limited to sensors for obtaining an indication of water temperature and pressure as well as sensors for obtaining an indication of warm air temperature and pressure. In FIG. 14 these sensors are indicated by the numeral 146. The sensor output signals are provided to an electronics section 148 which contains signal conditioning circuitry as well as a transmitter for transmitting the information to the control station of the tanker aircraft. With the information thus received, the fluid flow from the tanker aircraft may be adjusted, if necessary to meet test specifications.

The electronics section 148 additionally includes a receiver for receiving signals from the tanker aircraft to, for example, initiate activation of the solenoid valves 42. Signals are transmitted to the tanker aircraft by means of transmitting antenna 150, and signals received from the tanker aircraft are received by receiving antenna 152. The battery pack 54 is indicated as supplying power to both the electronics section 148 and the solenoid valves 42.

Figure 15:
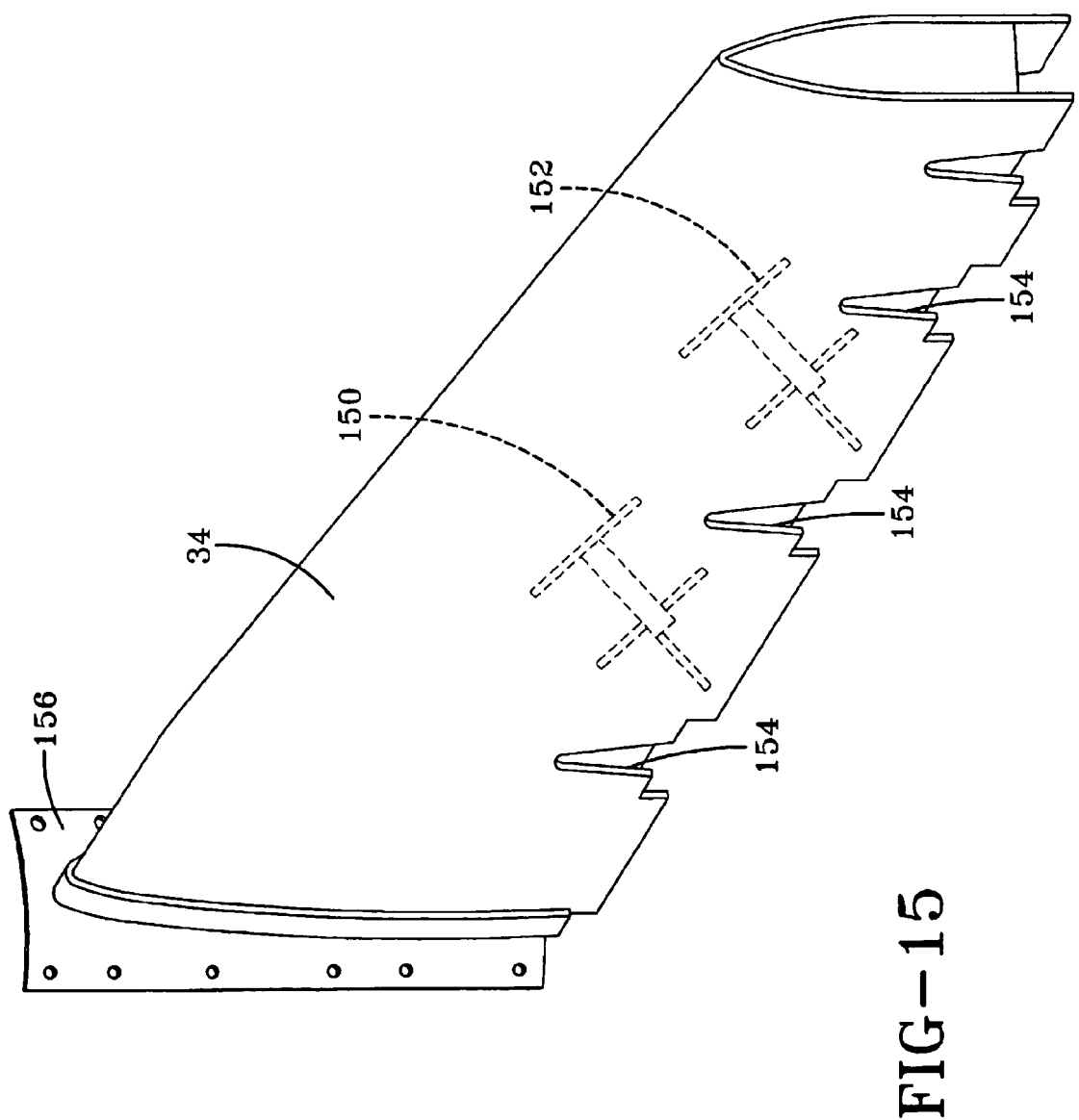
FIG. 15 illustrates a shroud member.

The transmitting and receiving antennas 150 and 152 may be conveniently located in the shroud 34 of a spoke member 24, preferably the one at the 12 o'clock position as seen in FIG. 2. FIG. 15 illustrates the antenna-containing shroud 34. Shroud 34, representative of all the shrouds, includes cutouts 154 for fitting over the manifold joints 30 so as to allow for a smooth airfoil shape of the spoke member 24. A flange 156 at the end of shroud 34 connects to the fluid distribution assembly 26, as may be seen in FIGS. 3 and 4. The transmitting and receiving antennas 150 and 152, contained within the shroud are shown dotted.

It will be readily seen by one of ordinary skill in the art that the present invention fulfills the object set forth herein. After reading the foregoing specification, one of ordinary skill in the art will be able to effect various changes, substitutions of equivalents and various other aspects of the present invention as broadly disclosed herein. For example, where the apparatus may be used in other than an environment using a tanker aircraft, the fluid channels may accommodate a liquid other than water and a gas other than air. It is therefore intended that the protection granted hereon be limited only by the definition contained in the appended claims and equivalents. Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. Spray apparatus, comprising:
a central fluid distribution assembly for receiving liquid and warm gas from a remote source;
a plurality of spoke members connected to, and extending radially from, said central fluid distribution assembly;
each said spoke member including a plurality of individual, radially arranged spoke segments, each said spoke segment including liquid and gas channels;
said fluid distribution assembly being connected to respectively deliver said liquid and warm gas to said liquid and gas channels of selected ones of said spoke segments;
a plurality of strut members, each including liquid and gas channels and connected to adjacent ones of said spoke members;
a plurality of manifold joints, each having liquid and gas passageways and being detachably connected to adjacent ones of said radially arranged spoke segments;
each said manifold joint additionally being detachably connected to at least first and second ones of said strut members so as to allow fluid communication between said spoke segments and said strut members;
said spoke members and said strut members having a rounded leading edge and tapered trailing edge, defining an airfoil;
a plurality of nozzles positioned at the trailing edge of selected ones of said spoke members and said strut members and connected for receiving the liquid and warm gas therein to generate a predetermined spray cloud.

2. Apparatus according to claim 1 wherein:
said liquid is water; and
said warm gas is warm airs.

3. Apparatus according to claim 2 wherein:
said apparatus is positioned at the end of a boom of a tanker aircraft; and which includes,
a gimbal assembly connecting said boom with said fluid distribution assembly allowing two degrees of freedom of movement therebetween.

4. Apparatus according to claim 3 wherein:
said water and warm air is supplied by said tanker aircraft; and which includes,
a flexible bellows within said gimbal assembly, said warm air being supplied within said bellows to said fluid distribution assembly.

5. Apparatus according to claim 1 which includes:

a plurality of bleed gas bolts connected to the said gas channels of said spoke members or said strut members;

each said bleed gas bolt having a central aperture to allow a controlled escape of warm gas from within said gas channel to which said bleed gas bolt is connected.

6. Apparatus according to claim 1 which includes:

a plurality of solenoid valves connected at the ends of said spoke members;

said solenoid valves being in communication with said gas channels of said spoke segments to allow discharge of gas therein when said solenoid valve is activated.

7. Apparatus according to claim 2 wherein:

said fluid distribution assembly distributes said water individually to each said spoke segment of selected spoke members.

8. Apparatus according to claim 7 wherein:

there are n spoke members; and said fluid distribution assembly distributes said water to said spoke segments of n/2 of said spoke members.

9. Apparatus according to claim 2 wherein:

said fluid distribution assembly distributes said warm air to all of spoke members connected to it.

10. Apparatus according to claim 1 which includes:

a choke in the liquid path in said fluid distribution assembly to govern the maximum rate of liquid supplied to said spoke members;

said choke being selected from a set of chokes having different size apertures to allow for different said maximum rates.

11. Apparatus according to claim 2 which includes:

a plurality of sensors positioned to obtain indications of at least the pressure and temperature of said water, and the pressure and temperature of said warm air, within selected ones of said liquid and gas channels; and an electronics section responsive to said pressure and temperature indications and operable to transmit them to a remote station.

12. Apparatus according to claim 11 wherein:

said apparatus is positioned at the end of a boom of a tanker aircraft; and said remote station is onboard said tanker aircraft.

13. Apparatus according to claim 11 which includes:

a tailcone positioned at the end of said fluid distribution assembly;

said electronics section being contained within said tailcone.

14. Apparatus according to claim 1 which includes:

a shroud attached to all of said spoke segments of a said spoke member.

15. Apparatus according to claim 11 which includes:

a shroud attached to all of said spoke segments of a said spoke member; and which additionally includes, transmitting and receiving antennas electrically connected to said electronics section;

said transmitting and receiving antennas being positioned within a said shroud.

* * * * *